INVENTOR
FRANCIS WEST, JR.

*Larson and Taylor*

ATTORNEYS

United States Patent Office 3,511,206
Patented May 12, 1970

3,511,206
METHOD AND APPARATUS FOR TOWING MARINE VESSELS, PARTICULARLY FOR CONTROLLING TOWED MARINE VESSELS
Francis West, Jr., Sea Cliff, N.Y., assignor to Propulsion Systems, Inc., Port Washington, N.Y., a corporation of New York
Filed Aug. 20, 1968, Ser. No. 754,079
Int. Cl. B63b 21/00
U.S. Cl. 114—236  15 Claims

ABSTRACT OF THE DISCLOSURE

A towed marine vessel is controlled automatically to maintain a predetermined relative bearing from the towed vessel to a towing vessel. Apparatus is provided on the towed vessel for continuously detecting the relative bearing of the towing vessel from the towed vessel and steering the towed vessel to maintain the relative bearing at a predetermined value. Suitable apparatus includes an automatic radio direction finder on the towed vessel for detecting the relative bearing of a signal transmitter on the towing vessel, the direction finder being coupled to an electrohydraulic steering system on the towed vessel so as to actuate the steering rudder appropriately to maintain the predetermined relative bearing. The automatic follower system can be deactivated so as to permit manual control of the steering on the towed vessel, and an auxiliary remote steering system can be activated in an emergency through a radio link between the towing vessel and the towed vessel. To compensate for the tendency of a loaded barge to overshoot, especially during operation of the automatic follower system, a rate gyro on the towed vessel is responsive to the rate-of-turn of the towed vessel to bias the steering system in the sense to oppose the swing, thus incorporating a damping factor in the steering system.

FIELD OF THE INVENTION

Figure 2:
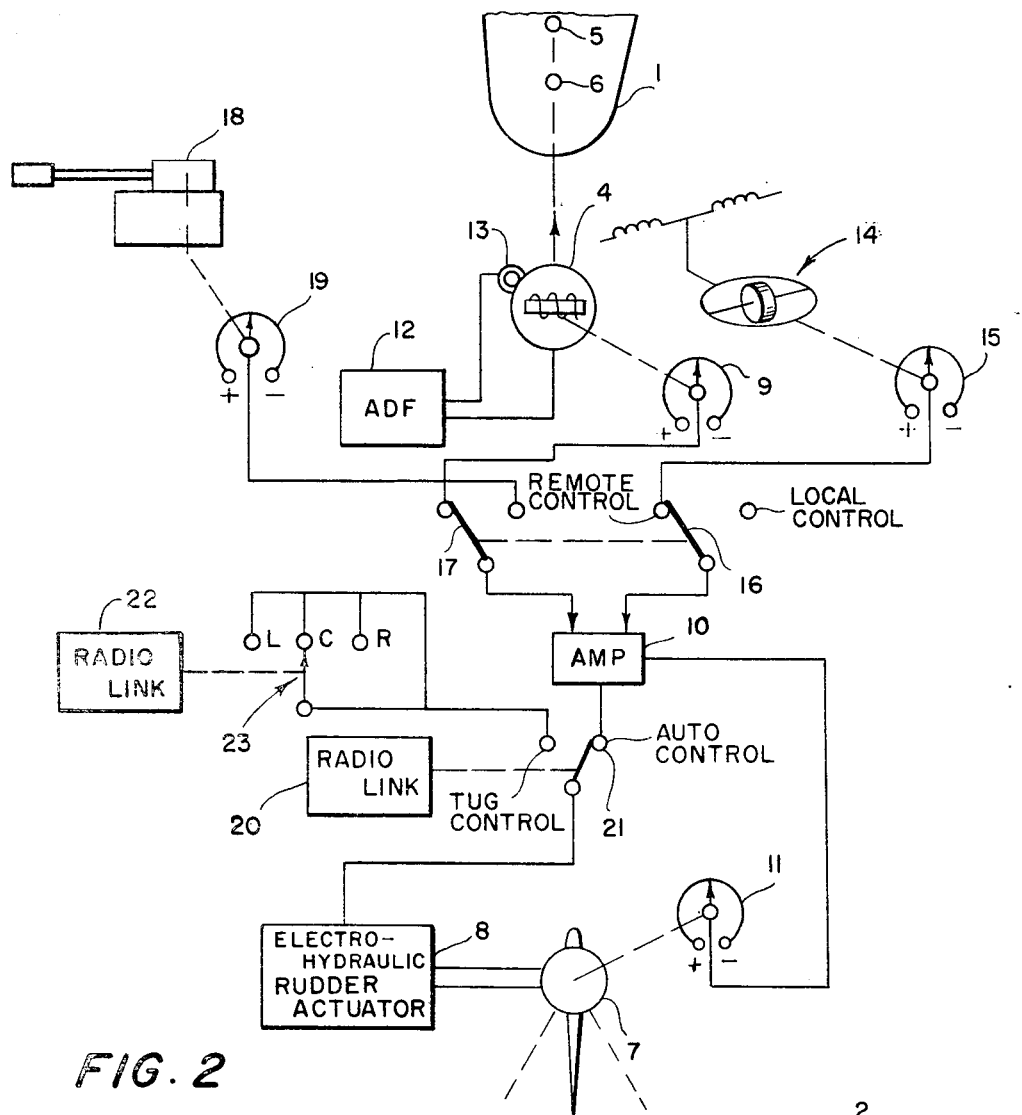

This invention relates to towing of marine barges or other vessels, and is especially applicable to the towing of such vessels in the open sea. Such vessels are normally unmanned, or at least do not have personnel for constantly steering the vessel, and this invention more particularly relates to a method of automatically steering such vessels, and to apparatus suitable for carrying out the method.

BACKGROUND OF THE INVENTION

Barges or vessels being towed in the open sea have a pronounced tendency to yaw or swing about the towline. One method of correcting or mimimizing this tendency is to fit large skegs aft on the towed vessels, set at an agle with the fore-and-aft line, to create a definite drag on the trailing end of the barge. This drag, of course, represents a serious power loss, and hence brings about a marked decrease in towing efficiency. The power loss could be avoided by stationing sufficient personnel on a towed vessel as to permit constant manual steering. However, especially for open sea towing, this is not feasible because of the man power cost and the cost of the facilities that would necessarily be provided on the towed vessel for such personnel.

A feasible steering method or arrangement for towed vessels must be automatic, and the problem has not been ignored by the industry. Thus, automatic steering systems have been proposed which depend on the geographical heading of the towed vessel, and attempt to maintain this heading identical to that of the tug boat or other towing vessel. Such systems are basically unsatisfactory for two reasons. First, the auto pilot must be reset by radio link control for every change of heading by the tug boat. Secondly, this is not a true follower system, and the auto pilot could attempt to steer a parallel but substantially offset course with the tug boat. In other words, with the long towlines which are used in open sea towing, the tug boat and the towed vessel might well be proceeding on identical headings but with the towed vessel substantially offset laterally of the towing vessel. Other systems have proved equally unsatisfactory. For instance, devices to measure the angle of the hawser or towline as a direction sensor are unsatisfactory since the hawser often dips into the sea, rendering the hawser angle unreliable as a direction sensor.

SUMMARY OF THE INVENTION

The instant invention proposes a method and apparatus whereby the towed vessel is steered automatically to maintain a predetermined relative bearing to the towed vessel. Hence the invention proposes true automatic follower steering and a true automatic follower system. This is accomplished by continuously detecting the relative bearing of the towing vessel and steering the towed vessel to maintain the relative bearing at a predetermined value. Preferably the control is such as to steer the towed vessel continuously toward the towing vessel, but the control may be such as to maintain other than a zero relative bearing so as to permit, for instance, a single towing vessel to tow two towed vessels with the two towed vessels being steered to maintain slightly different relative bearings on the towed vessel, thus maintaining the two towed vessels sufficiently apart that they would not interfere with each other.

In the presently preferred form of the invention, a detectable signal is emitted from the towing vessel, and the relative bearing of the emitted signal is detected on the towed vessel. If this relative bearing differs from the predetermined relative bearing, a rudder command signal is generated on the towed vessel, the command signal being indicative of the difference between the detected relative bearing and a predetermined relative bearing. This command signal is applied to a rudder actuator on the towed vessel to change the steered course of the towed vessel and equalize the detected relative bearing and the predetermined relative bearing.

Although the invention contemplates different forms of apparatus, each of the feasible forms constitutes basically means for continuously detecting the relative bearing of the towing vessel from the towed vessel and steering the towed vessel to maintain the relative bearing at a predetermined value. The invention in its apparatus form preferably, but not necessarily, includes means on the towing vessel for emitting a detectable signal, and means on the towed vessel for detecting the relative direction of the signal emitting means and actuating the steering rudder of the towed vessel in the sense to steer the towed vessel continuously in a predetermined direction relative to the detected location of the signal emitting means. In its presently preferred form, a continuous wave transmitter is used to emit the detectable signal, and an automatic direction finder is used on the towed vessel to detect the relative bearing of the transmitter. The automatic direction finder, which can be of conventional form, includes a loop antenna which is continuously driven by a servo motor to a null position on the continuous wave transmitter. The loop antenna is coupled to the rudder command potentiometer of a rudder control bridge circuit, which can be of conventional form.

As will become more apparent hereinafter, other forms of apparatus may be used in practicing the invention, but cost factors, reliability, availability, etc., make the automatic direction finder system the preferred form of apparatus of the invention.

Accordingly, a primary object of the instant invention is to provide a marked improvement in the art of towing vessels, especially in the steering control of towed vessels. More particular objects reside in the provision of an improved method for steering towed vessels, and in the provision of advantageous and practical apparatus for automatically controlling the steering of towed vessels in a true follower manner.

Other and more particular objects, advantages and features of the invention will be apparent to those skilled in the art from the ensuing description and illustration of a presently preferred embodiment of the invention. I have set forth in the appended claims those features and procedures which I consider characteristic of my invention, but the invention itself, its structure, capabilities, and operation, will be best understood by those skilled in the art from the ensuing description taken in conjunction with the accompanying illustrations.

BRIEF DESCRIPTIONS OF THE DRAWINGS

Figure 1:
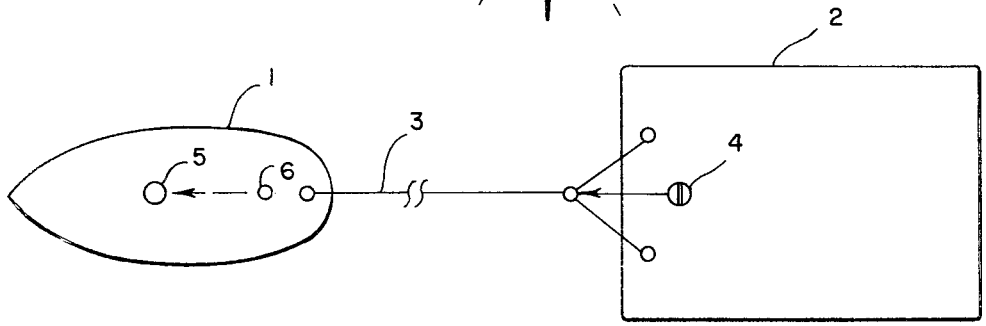

FIG. 1 is a diagrammatic illustration of a towing vessel and towed vessel of the type to which the invention relates; and FIG. 2 is a diagrammatic illustration of apparatus in accordance with the presently preferred embodiment of the invention, only so much of the vessels themselves being shown as would facilitate explanation of the embodiment.

DETAILED DESCRIPTION OF THE PREFERRED EMBODIMENT

As illustrated in FIG. 1, a towing vessel 1, such as an oceangoing tug, is connected by a hawser or towline 3 to a barge 2. The tug includes a transmitter 5 and a continuous wave transmitter 6, and a loop antenna is shown schematically at 4 on the barge. These elements will be explained more fully in connection with FIG. 2. The barge is of the normally unmanned type, and includes a steering rudder which is actuated by an electrohydraulic steering control, which in turn is controlled by a bridge circuit of a basically conventional type, these elements being illustrated in FIG. 2.

Referring now to FIG. 2, the barge itself is not illustrated, but it will be understood that all components below the schematically illustrated tug 1 are located on the barge. The barge includes a conventional steering rudder 7 controlled by a conventional electrohydraulic steering control 8. The rudder control bridge circuit includes a command potentiometer 9 and follow up potentiometer 11 connected in a DC bridge circuit with amplifier 10, which is electrically connected to electrohydraulic steering control 8 to transmit control signals thereto. In a conventional arrangement of the type shown in FIG. 1, amplifier 10 may be a magnetic amplifier including differential relays for transmitting to electrohydraulic steering control 8 control signals of polarity and magnitude reflecting the settings of potentiometers 9 and 11. Electrohydraulic steering control 8 may conventionally include a hydraulic pump or pumps and solenoid control directional valves for actuating a steering motor or actuator of the rudder 7. For purposes of the instant invention, these elements may all be considered as conventional and well known in the art, although they may not be commonplace on barges as such. Exemplary electrohydraulic control arrangements of this general type are shown, for instance, in U.S. Pat. 2,812,026 (Braddon, Variable Pitch Propeller Control System) and in commonly assigned copending application Ser. No. 737,224 (steering and propeller pitch control), although those arrangements are more sophisticated than necessary for barges.

In normal operation command potentiometer 9 is rotated to a position indicative of a desired position of the rudder, thus unbalancing the bridge, and causing amplifier 10 to pass an appropriate control signal to electrohydraulic steering control 8, which in turn deflects the rudder 7 appropriately. Movement of the rudder is accompanied by movement of follow up potentiometer 11, which rebalances the bridge when the rudder reaches its commanded position.

An automatic radio direction finder 12 is located in the barge, and controls servo motor 13 so as to continuously drive the loop antenna 4 to a null position on continuous wave transmitter 6 located on the towing vessel 1. Continuous wave transmitter 6 is a low frequency transmitter to avoid interference from marine beacon or communication transmissions, and the direction finder receiver is sharply tuned to this frequency. Loop antenna 4 is coupled to command potentiometer 9 so that the command potentiometer is rotated proportionally with the antenna. The system is calibrated such that rudder 7 will be in the midship position when antenna 4 is pointing in a predetermined direction relative to the center line of the barge, this predetermined direction usually being parallel with the center line of the barge so as to steer the barge directly toward transmitter 6 on the tug. Movement of antenna 4 away from its predetermined direction relative to the center line of the barge indicates the need for a change of heading of the barge so as to maintain the desired bearing of the tug from the barge. This is accomplished automatically in that movement of the antenna 4 rotates command potentiometer 9 to a position indicative of a commanded rudder position. Amplifier 10 compares the signal of command potentiometer 9 with that of follow up potentiometer 11 to cause electrohydraulic steering control 8 and rudder 7 to continuously follow the position of the command potentiometer. Where the system is set to follow the tug exactly, when the loop antenna is pointing exactly forward the barge rudder will be driven to the midship position. If the barger swings away from the tug, the loop antenna will be turned through the same angle, and this will cause the rudder to be deflected from midships in a proportional angle. Hence the barge is steered in a manner to continuously maintain a predetermined relative bearing from the barge to the tug.

Because a heavily burdened barge will have a tendency to overshoot when effecting a change of heading, a damping factor advantageously should be incorporated in the automatic steering servo loop to counteract this. In the illustrated embodiment, this damping factor is provided by a rate gyro 14 which will be deflected in proportion to the rate-of-turn of the barge, and will, in turn, cause a deflection of rate potentiometer 15. This rate signal will be passed to amplifier 10 and summed with the signal from command potentiometer 9 to provide the required damping factor. In such rate damping, the rudder is applied in proportion to the rate or velocity of the swing in a direction to oppose the swing, thus minimizing the tendency of the barge to turn beyond the desired heading. For purposes of explanation of this invention, rate gyro 14 may be considered as conventional. Basically a simple rate gyro is one of a class of instruments known as single-axis gyroscopes. It is mounted to the vessel by only a single gimbal so that when the vessel turns, the rate gyro is caused to tilt or precess against a spring by an angle which indicates the rate of turn.

Manually operated ganged transfer switches 16 and 17 allow the rudder to be locally controlled on the barge by means of a lever 18 and poteniometer 19 while the barge is being maneuvered around piers and harbors in the manned condition. When the barge is unmanned, switches 16 and 17 will be left in the remote control positions whereby command potentiometer 9 and rate potentiometer 15 are incorporated in the bridge circuit. In the local position, these potentiometers are switched out of the bridge circuit, and replaced by potentiometer 19.

For optional use in maneuvering, or for emergency use upon failure of the automatic follower system, radio link 20, under the control of transmitter 5 on the tug, is operative to move transfer switch 21 from the "auto control" position to the "tug control" position. In the "tug control" position, radio link 22 can be actuated from a control switch on the tug to move switch 23 to a right, left, or center or midship position, which in turn causes electrohydraulic steering control 8 to move the rudder 7 to the commanded position. In this type of control, electrical contacts are closed to start rudder movement, and this movement continues until a limit switch opens the control circuit at a preselected rudder angle. Such an on-off system is well adapted to remote radio link control. If desired, additional contacts operated by limit switches could energize indicator lights on the tug to show that the rudder has moved to the ordered position. This control could also be arranged to position twin rudders to equal but opposite angles, to create a drag in the conventional manner, in the event of failure of the automatic follower system.

From the foregoing description, the effectiveness and versatility of the overall system will be readily appreciated. Thus, during normal towing, the automatic follower system continuously operates to steer the barge or other towed vessel on headings corresponding to a predetermined relative bearing of the tug from the barge, this relative bearing usually being dead ahead such that the barge is steered continuously toward the tug. This avoids the need for drag skegs and their attendant power loss, and also avoids the possibility of the barge steering a parallel but substantially offset course relative to the course of the tug, unless, of course, the follower system is set for such an operation. Also, variations in the hawser angle because of sea or wave effects will have absolutely no effect on the steering of the barge. When the need arises for maneuvering in harbors and the like, a man is stationed on the barge and the barge is manually steered through lever 18 after switches 16 and 17 are placed in the "local control" position. In the event of failure of the automatic follower system, or for any other reason, radio link 20 can be actuated from the tug to move switch 21 to the "tug control" position, and the barge can thereafter be steered remotely from the tug through radio link 22 and control switch 23.

Although the automatic radio direction finder is the preferred arrangement, means other than radio to sense the direction of the tug from the barge could be used without departing from the purpose and substance of invention. For instance, a workable arrangement could take the form of a servo-driven infrared detector, pointing to a concentrated and beamed heat source on the tug. This type of detector can function through rain, snow or fog for limited distances, and can be made directionally sensitive. A further workable means of direction sensing is that of sonar, or underwater sound detection, in which the transducer is servo-driven to point to a noise source on the tug. This has the advantage that the propeller could be used as the noise source, but has the disadvantage that other vessels in the vicinity could cause serious interference.

The illustrated embodiment is, of course, susceptible of various other modifications and rearrangements within the purpose and substance of the invention. Accordingly, it is to be understood that the illustrated embodiment is merely exemplary of one form of the invention, and that the scope of the invention is as defined in the subjoined claims construed in the light of the foregoing descriptions and illustrations.

I claim:

1. In combination, for towing at sea, a steerable towing marine vessel and a towed marine vessel connected thereby by a relatively long towline, said towed vessel including a steering rudder, means on said towing vessel for emitting a detectable signal, and means on said towed vessel for detecting the relative bearing of said signal emitting means from said towed vessel regardless of the relative bearing of said towed vessel from said towing vessel and actuating said steering rudder in the sense to steer said towed vessel continuously in a predetermined direction relative to the detected relative bearing of said signal emitting means so as to maintain a predetermined relative bearing of said towing vessel from said towed vessel regardless of the relative bearing of said towed vessel from said towing vessel.

2. The invention as claimed in claim 1 wherein said means on said towed vessel comprises automatic direction finder means.

3. The invention as claimed in claim 2 wherein said signal emitting means on said towing vessel comprises a wave transmitter.

4. The invention as claimed in claim 1 wherein said signal emitting means on said towing vessel comprises a radio wave transmitter, and said means on said towed vessel comprises movable antenna means, means for directing said antenna means continuously toward said transmitter, and means responsive to movement of said antenna means away from a predetermined orientation relative to the centerline of said towed vessel for actuating said steering rudder to change the course of said towed vessel such that said antenna is returned to its predetermined orientation relative to the centerline of said towed vessel, and said towed vessel is steered in said predetermined direction relative to the detected relative bearing of said signal emitting means.

5. The invention as claimed in claim 1 wherein said signal emitting means on said towing vessel comprises a continuous wave transmitter, and wherein said means on said towing vessel comprises automatic radio direction finder means including a rotatable loop antenna which is continuously maintained at an orientation such that the incoming signal from the transmitter is always at right angles to the antenna plane, a rudder command circuit, and means responsive to movement of said antenna away from a predetermined orientation relative to the centerline of said towed vessel for controlling said rudder command circuit so as in turn to move said rudder and change the course of said towed vessel until the predetermined orientation is restored between said antenna and the centerline of the towed vessel.

6. The invention as claimed in claim 5 wherein said rudder command circuit includes a movable member for controlling said rudder command circuit, and said antenna and said movable member are operatively coupled together, whereby the orientation of said antenna controls the position of said rudder.

7. The invention as claimed in claim 1 wherein said means on said towed vessel comprises a rudder actuator and direction finder means for controlling said rudder actuator in response to changes in the relative bearing of said signal emitting means.

8. The invention as claimed in claim 7 further comprising damping means responsive to the rate-of-turn of the towed vessel in one direction for biasing said rudder control circuit in the sense to move the rudder in a direction to oppose the turn so as to minimize the tendency of the towed vessel to turn beyond a direction commanded by said direction finder means.

9. The invention as claimed in claim 7 further comprising a manual steering member on said towed vessel for controlling said rudder control circuit, and transfer switch means for selectively rendering said manual steering member or said direction finder means operative to control the rudder control circuit.

10. The invention as claimed in claim 7 further comprising remote radio controlled actuator means on said towed vessel for setting the positions of said rudder under command radio signals from the towing vessel, remote radio controlled switch means on said towed vessel for transferring steering control from said direction finder means to said radio controlled actuator means, and transmitter means on said towed vessel for controlling said radio controlled switch means and radio controlled actuator means.

11. A method of towing a marine vessel at sea comprising attaching the towed vessel to a towing vessel by a relatively long towline, propelling the towing vessel, substantially continuously emitting a detectable signal from the towing vessel, substantially continuously detecting the relative bearing from the towed vessel of the emitted signal regardless of the relative bearing of the towed vessel from the towing vessel generating a rudder command signal indicative of any difference between the detected relative bearing and a predetermined relative bearing, and applying said rudder command signal to rudder actuating means on said towed vessel to control the steered course of said towed vessel such that the detected relative bearing is maintained substantially equal to the predetermined relative bearing regardless of the relative bearing of the towed vessel from the towing vessel.

12. A marine vessel of the type adapted normally to be propelled by being towed by a powered vessel connected through a towline, said vessel to be towed including a movable steering rudder, wherein the improvement comprises an automatic follower system on the vessel to be towed for detecting the relative bearing of a powered towing vessel independently of the course heading of the powered towing vessel and controlling said rudder so as substantially continuously to maintain substantially a predetermined relative bearing from the vessel to be towed to the powered towing vessel regardless of the relative bearing from the towing vessel to the vessel to be towed.

13. A marine vessel as claimed in claim 12 wherein said automatic follower system controls said rudder so as to steer said vessel to be towed substantially directly and continuously toward the powered towing vessel.

14. A marine vessel as claimed in claim 12 wherein said automatic follower system comprises a movable signal receiver, means for continuously directing said signal receiver toward a signal source on a towing vessel, and means responsive to movement of said signal receiver away from a predetermined orientation relative to the centerline of the vessel to be towed for actuating said rudder and changing the direction of the vessel to be towed to restore the predetermined orientation of the signal receiver relative to said centerline.

15. In combination, a towing marine vessel, a towed marine vessel connected thereto by a towline, and means for continuously detecting the relative bearing of the towing vessel from the towed vessel and steering said towed vessel to maintain said relative bearing at a predetermined value regardless of the relative bearing of the towed vessel from the towing vessel.

References Cited

UNITED STATES PATENTS 2,585,164    2/1952    Perkins _____ 343—117
3,086,490    4/1963    Nichols _____ 114—235

TRYGVE M. BLIX, Primary Examiner